O. A. MYGATT.
GLASSWARE.
APPLICATION FILED JUNE 5, 1908.
976,681.
Patented Nov. 22, 1910.
2 SHEETS—SHEET 1.
Fig. 1.
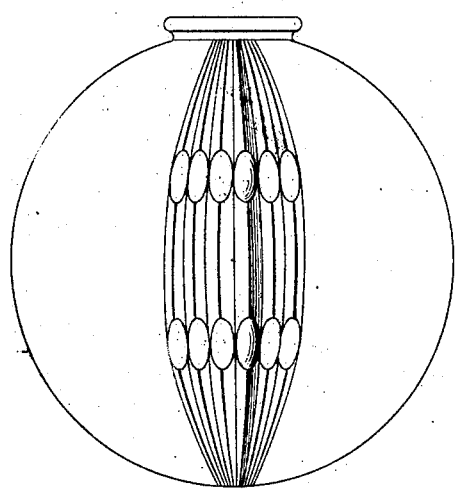
Fig. 2.
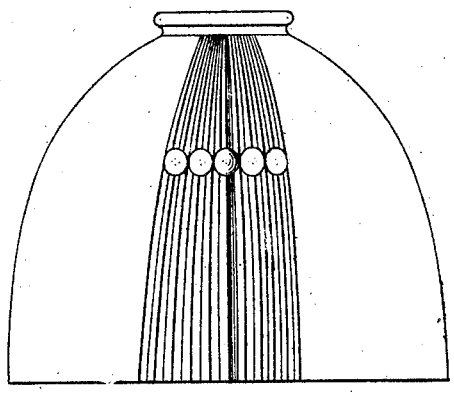
Fig. 3.
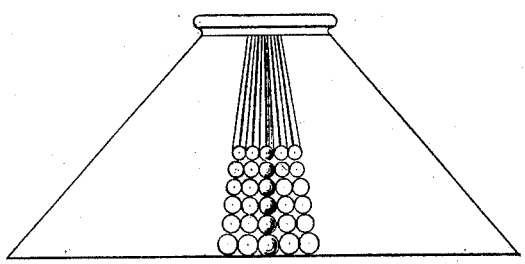
Fig. 4. Fig. 5. Fig. 4ᵃ Fig. 5ᵃ
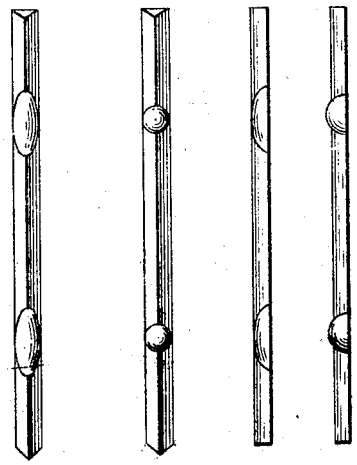
WITNESSES
INVENTOR
BY
ATTORNEYS

O. A. MYGATT.
GLASSWARE.
APPLICATION FILED JUNE 5, 1908.

976,681.

Patented Nov. 22, 1910.
2 SHEETS—SHEET 2.

WITNESSES

INVENTOR
Otis A. Mygatt
BY
ATTORNEYS

UNITED STATES PATENT OFFICE.

OTIS A. MYGATT, OF NEW YORK, N. Y.

GLASSWARE.

976,681.

Specification of Letters Patent. Patented Nov. 22, 1910.

Application filed June 5, 1908. Serial No. 436,865.

*To all whom it may concern:*

Be it known that I, OTIS A. MYGATT, a citizen of the United States, and resident of the city of New York, in the county of New York and State of New York, have invented a certain new and useful Improvement in Glassware, of which the following is a specification.

My invention relates to a new type of corrugations for ribbed glassware which is intended to combine in an integral glass article the optical value of radial light directing prisms and lens-like surfaces.

The object of my invention is to make glass shades and reflectors, part of whose surfaces will be covered with substantially radial light directing prisms and part of whose surfaces will be covered with lens-like protuberances calculated to magnify and concentrate the light which is transmitted through such lenticular protuberances.

It is well known that if a glass body is covered with radial prisms of the double reflecting type, the light rays will be reflected back into the interior of the glass. This is the type of prism which I prefer to use in connection with my lenticular light transmitting and magnifying surfaces, although my present invention can also be used in combination with other types of substantially radial prisms. Where glass reflectors are made having their exterior covered with double reflecting prisms, their entire surface becomes of a homogeneous type of reflecting medium, and practically too much light is concentrated down and out of the open mouth, and not enough light is allowed to be transmitted through the glass and out.

In my present invention, I swell out the prism at different points into a curved lenticular surface calculated to concentrate or magnify the light rays which pass through it. When viewed from the inside, the reflector appears composed of substantially radial prisms of very brilliant appearance alternating with circular or oval dark spaces. These dark spaces are caused by the fact that the light rays are not reflected from these circular or oval areas caused by swelling the prism into a definite lenticular curve, but pass through the glass and are concentrated in definite directions. When viewed from the outside these round or oval spaces become brilliantly illuminated lenses against the dark surfaces of the double reflecting prisms part which is throwing most of the light in the opposite direction.

As a rule I prefer to make use of substantially radial corrugations which run from top to bottom on the outside of my shade or reflector, these corrugations as above set forth being angular or directive of light in parts of their lengths and in other parts lenticular and transmissive or concentrative of light. In other words, I prefer to use an integral corrugation which for part of its length acts as a double reflecting prism, which reflects the light rays to the opposite side of the glass and out, and on another part or parts of its length is a light magnifying surface for rays that are transmitted through this lenticular portion. These lens-like parts permit of a concentration which no other reflector has permitted.

By varying the relative position of the lenticular and light transmitting surface to the double reflecting surface, and also the relative and proportionate areas occupied by the different parts of the corrugation, acting according to optical laws, I am enabled to make reflectors having practically any light distribution. These will also have the ornamental feature that upon the outside those parts which are intended to directly transmit the light, appear to be brilliantly illuminated by brilliant sparkling beads or spherical bodies of light.

Figure 1 is a side elevation of a globe embodying my invention. Fig. 2 is a similar view of a reflector. Fig. 3 is still another side elevation of a reflector. Fig. 4 is a front view of a single prism. Fig. 5 is a similar view of another form of prism. Fig. 4ª is a side view of the prisms shown in Fig. 4. Fig. 5ª is a side view of the prism shown in front view in Fig. 5. Fig. 6 is a side elevation and partial section of one of the modified forms of reflector showing the action of some of the rays of light. All the views show my invention in modified ways.

Fig. 1 is a side elevation of a globe having radial prisms on its outer surface interrupted by two rows of oval-shaped lenticular protuberances. The drawing shows only a portion of the surface covered with the corrugations, but it is understood that these may cover the whole surface of the globe. This also applies to Fig. 2 and Fig. 3. The lens-like protuberances allow the light to pass through and concentrate it in certain definite directions.

Figs. 2 and 3 are side elevations of two forms of my invention applied to reflectors. Fig. 2 shows a row of lenses, each of which extends over the width of two prisms. In Fig. 3 a number of rows of lenses are banded together to strongly concentrate the light which passes through this portion of the reflector.

Figs. 4 and 5 show plan views of two prismatic ribs modified by two forms of lens-like protuberances. Side elevations of these corrugations are shown in Figs. 4ª and 5ª.

Figure 6:
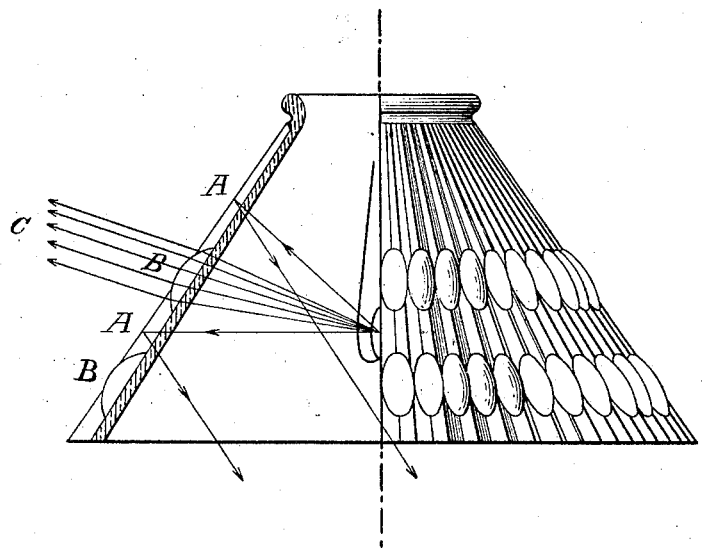
Fig. 6 is a partial elevation and partial section which illustrates how the rays of light from a lamp within a reflector will be reflected back from the prisms A—A and out of the mouth of the reflector; whereas the rays of light which strike the lens surfaces B—B pass through the reflector at these points and are concentrated in certain definite directions C.

Having described my invention, what I claim is—

1. A specular reflecting prism having a lenticular surface formed upon the body of the prism.

2. A reflector having a prismed specular reflecting surface and lenticular surfaces formed upon the bodies of the prisms.

3. A reflector provided with radial specular reflecting prisms and lenticular surfaces formed upon the bodies of the prisms.

OTIS A. MYGATT.

Witnesses:
 CHAS. K. DAVIES,
 E. L. CORBETT.